United States Patent
Gates et al.

(10) Patent No.: US 10,837,312 B2
(45) Date of Patent: Nov. 17, 2020

(54) SYSTEM FOR BRAKING A LOW PRESSURE SPOOL IN A GAS TURBINE ENGINE

(71) Applicant: PRATT & WHITNEY CANADA CORP., Longueuil (CA)

(72) Inventors: Patrick Gates, Westport (CA); Olivier Bibor, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 717 days.

(21) Appl. No.: 14/633,565

(22) Filed: Feb. 27, 2015

(65) Prior Publication Data
US 2016/0251977 A1 Sep. 1, 2016

(51) Int. Cl.
| | |
|---|---|
| F01D 21/00 | (2006.01) |
| F01D 21/02 | (2006.01) |
| F01D 5/06 | (2006.01) |
| F01D 25/18 | (2006.01) |
| F16D 63/00 | (2006.01) |

(52) U.S. Cl.
CPC ............. *F01D 21/006* (2013.01); *F01D 5/06* (2013.01); *F01D 21/02* (2013.01); *F01D 25/18* (2013.01); *F16D 63/002* (2013.01); *F05D 2220/321* (2013.01); *F05D 2240/24* (2013.01); *F05D 2260/902* (2013.01); *F05D 2260/903* (2013.01); *F05D 2260/904* (2013.01); *F05D 2270/021* (2013.01); *F05D 2270/022* (2013.01); *F05D 2270/023* (2013.01); *F05D 2270/091* (2013.01); *F05D 2270/304* (2013.01)

(58) Field of Classification Search
CPC .......... F01D 21/006; F01D 21/02; F01D 5/06; F01D 25/18; F16D 63/002
USPC .................................. 60/204; 416/32, 14, 26
See application file for complete search history.

(56) References Cited

U.S. PATENT DOCUMENTS

| | | | |
|---|---|---|---|
| 3,626,692 A * | 12/1971 | Kumm | F02C 7/36 475/32 |
| 3,710,576 A * | 1/1973 | Evans | F01D 21/006 60/39.163 |
| 4,651,521 A * | 3/1987 | Ossi | F01D 15/12 60/226.3 |
| 5,029,439 A | 7/1991 | Berneuil et al. | |
| 5,207,305 A * | 5/1993 | Iverson | F16D 35/005 188/264 E |

(Continued)

FOREIGN PATENT DOCUMENTS

| | | |
|---|---|---|
| EP | 1873358 | 1/2008 |
| WO | 20060021078 | 3/2006 |
| WO | 20080134853 | 11/2008 |

*Primary Examiner* — Jesse S Bogue
*Assistant Examiner* — Loren C Edwards
(74) *Attorney, Agent, or Firm* — Norton Rose Fulbright Canada LLP

(57) ABSTRACT

A braking system for the low pressure spool of a gas turbine engine includes a braking assembly connected to the low pressure spool and reversibly configurable between an actuated state and an unactuated state. The braking assembly in the unactuated state allows rotation of the low pressure spool without interference. The braking assembly in the actuated state applies a force opposing the rotation of the low pressure spool. A method of controlling the speed of rotation of a low pressure spool and a method of controlling the speed of rotation of low and high pressure spools are also discussed.

20 Claims, 7 Drawing Sheets

(56) References Cited

U.S. PATENT DOCUMENTS

| | | | |
|---|---|---|---|
| 5,867,979 A * | 2/1999 | Newton | F02C 3/113 |
| | | | 310/90.5 |
| 6,148,605 A | 11/2000 | Lardellier | |
| 6,672,049 B2 | 1/2004 | Franchet et al. | |
| 7,225,607 B2 | 6/2007 | Trumper et al. | |
| 7,448,198 B2 | 11/2008 | Trumper et al. | |
| 7,926,287 B2 * | 4/2011 | Ullyott | F01D 21/06 |
| | | | 60/773 |
| 8,499,874 B2 | 8/2013 | Dewis et al. | |
| 8,708,083 B2 | 4/2014 | Dewis et al. | |
| 2008/0048451 A1 | 2/2008 | Herzog et al. | |
| 2008/0279675 A1 * | 11/2008 | Ullyott | F01D 21/06 |
| | | | 415/1 |

\* cited by examiner

SYSTEM FOR BRAKING A LOW PRESSURE SPOOL IN A GAS TURBINE ENGINE

TECHNICAL FIELD

The application relates generally to gas turbine engines and, more particularly, to low pressure spools in gas turbine engines.

BACKGROUND OF THE ART

Under certain flight conditions, such as a rapid descent, the exhaust gases from the combustor are reduced to such an amount that the low pressure spool may be unloaded and free to rotate by elements exteriors to the combustor. For example, on turbofans, the ambient air may rotate the fan, which in turn may rotate a low pressure turbine of the low pressure spool at a speed exceeding recommended levels. On a helicopter turboshaft engine, the helicopter rotor can be driven by the airflow through the rotor blades when the aircraft is in rapid descent to a point where the engines do not have to provide any power to maintain the rotor speed. Although in most cases there is a clutch separating the rotor system from the engine drive system to help prevent the main rotor from driving the free low pressure turbine to undesirable speeds, it is usually difficult to keep the free turbine from exceeding maximum speeds without any torque loads from the main rotor system. In some cases, the speed of rotation of the low pressure turbine may exceed recommended levels even with the gas generating spool (high pressure spool) operating at its lowest levels. In addition, once the rapid descent is terminated, there may be an undesirable delay to accelerate the high pressure spool to generate a required power level.

SUMMARY

In one aspect, there is provided a gas turbine engine comprising: a low pressure spool and a high pressure spool rotating independently from one another; and a braking assembly connected to the low pressure spool, the braking assembly being reversibly configurable between an actuated state and an unactuated state, the braking assembly in the unactuated state allowing rotation of the low pressure spool without interference, the braking assembly in the actuated state applying a force opposing the rotation of the low pressure spool.

In another aspect, there is provided a braking system for controlling a speed of rotation of a low pressure spool of a gas turbine engine, the braking system including: a braking assembly reversibly configurable between an actuated state and an unactuated state, the braking assembly in the unactuated state allowing rotation of the low pressure spool without interference, the braking assembly in the actuated state applying a force opposing the rotation of the low pressure spool; at least one sensor measuring at least one parameter indicative of a speed of rotation of the low pressure spool; a database including at least one threshold value of the at least one parameter; and a control unit in communication in real time with the at least one sensor and the database, the control unit selectively configuring the braking assembly between the actuated state and the unactuated state based on the at least one threshold value stored in the database and the at least one parameter by the at least one sensor.

In a further aspect, there is provided a method of controlling a speed of rotation of a low pressure spool in a gas turbine engine, the method comprising: determining if at least one parameter indicative of the speed of rotation of the low pressure spool has crossed at least one predetermined threshold value; if the at least one parameter has crossed the predetermined threshold value, actuating a braking assembly to apply a force to the low pressure spool opposing the rotation thereof.

In a further aspect, there is provided a method of controlling a speed of rotation of a low pressure spool in a gas turbine engine having the low pressure spool and a high pressure spool, the method comprising: maintaining the speed of rotation of the high pressure spool below a second threshold value by controlling a fuel flow of the gas turbine engine; and maintaining the speed of rotation of the low pressure spool above a first threshold value by selectively applying a force opposing the rotation of the low pressure spool on the low pressure spool.

DESCRIPTION OF THE DRAWINGS

Reference is now made to the accompanying figures in which.

DETAILED DESCRIPTION

Figure 1:
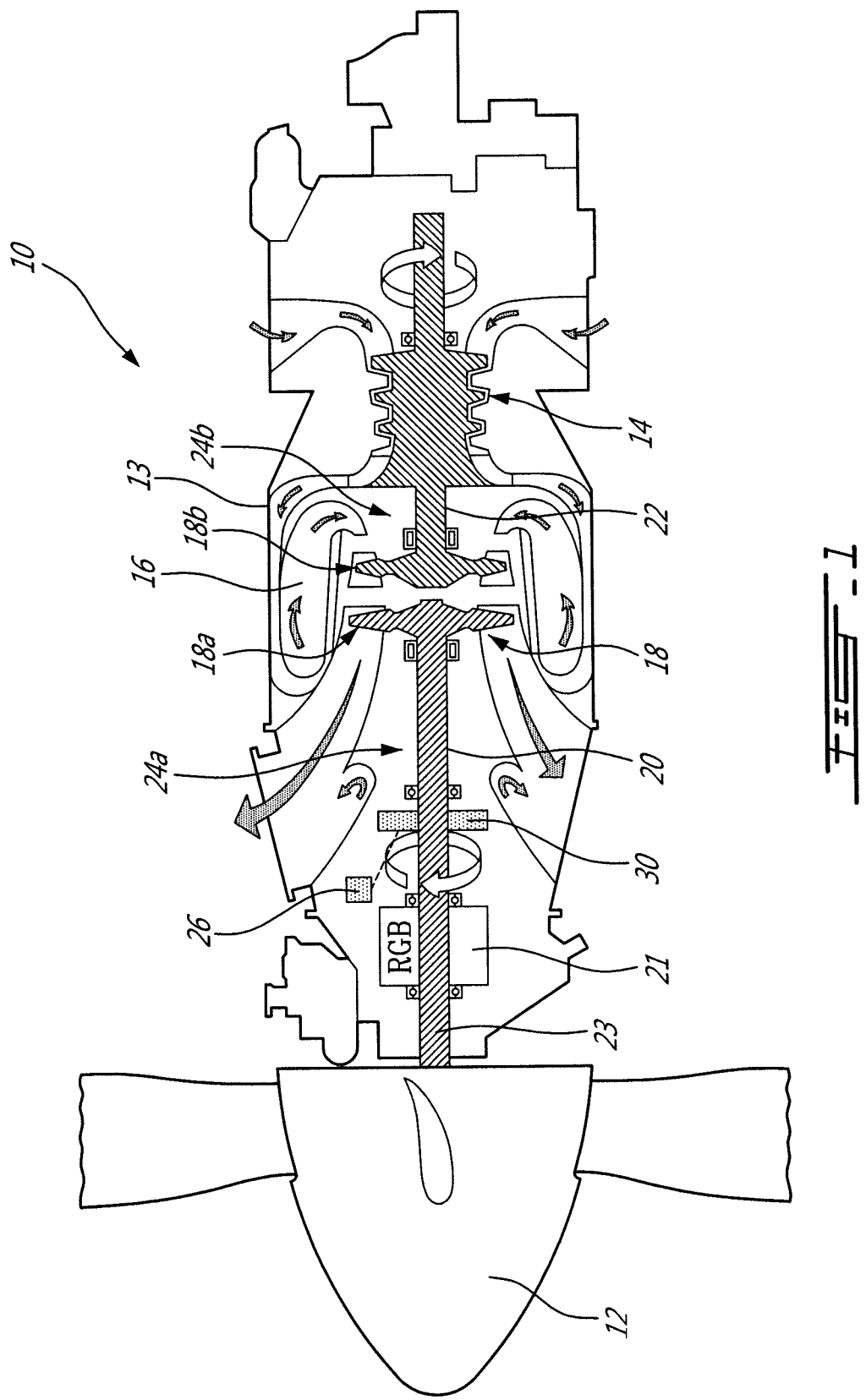
FIG. 1 is a schematic cross-sectional view of a gas turbine engine having a braking system for a low pressure spool of the gas turbine engine.

FIG. 1 illustrates a first embodiment of gas turbine engine 10 of a type preferably provided for use in subsonic flight, generally comprising in serial flow communication a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 includes a low pressure turbine having one or more rotor(s) 18a connected to the propeller 12, and a high pressure turbine having one or more rotor(s) 18b connected to the compressor section 14. Each of the turbines may thus include one or more turbine stages. Accordingly, although a single turbine rotor is mentioned in the following description, it is understood that additional rotors may be included in each turbine and mounted on each shaft, and that such embodiments are also within the scope of this disclosure.

The low pressure turbine rotor 18a is mounted at one end of a low pressure shaft 20, so that a rotation of the low pressure turbine rotor 18a rotates the low pressure shaft 20. Another end of the low pressure shaft 20 is connected to a reduction gearbox (RGB) 21. The RGB 21 transmits a speed of rotation to a propeller shaft 23 that is reduced relative to a speed of rotation of the low pressure shaft 20. The propeller shaft 23 is shown in this embodiment to be in-line with the low pressure shaft 20, but it is contemplated that the gas turbine engine 10 could have the propeller shaft 23 offset from the low pressure shaft 20. This is the case, for example, in gas turbine engines with offset gearboxes.

The low pressure turbine rotor 18a and the low pressure shaft 20 are part of a low pressure spool 24a. The high pressure turbine rotor 18b is connected to the rotor(s) of the compressor section 14 via a high pressure shaft 22. The high pressure turbine rotor 18b, the rotor(s) of the compressor section 14, and the high pressure shaft 22 are part of a high pressure spool 24b. The low pressure spool 24a and the high pressure spool 24b rotate independently from one another.

The gas turbine engine 10 includes a braking assembly 30 that is connected to (so as to apply a braking force opposing to the rotation of) the low pressure spool 24a, the connection with the low pressure spool 24a being done either directly, or indirectly via an element drivingly engaged with the low pressure spool 24a. The braking assembly 30 is disposed on or about a portion of the low pressure spool 24a or an element drivingly engaged with the low pressure spool 24a to reduce or prevent increase of a speed of rotation of the low pressure turbine rotor 18a when a control unit 26 determines through monitoring of an appropriate parameter that the low pressure turbine rotor 18a is rotating above a predetermined threshold value. This parameter could be, for example, the speed of the low pressure spool 24a being above a predetermined threshold value, or the torque of the low pressure spool 24a being below a predetermined threshold value, or the speed of the high pressure spool 24b being below a predetermined threshold value, or any other parameters indicative of the speed of rotation of the low pressure spool 24a. For example, in a particular embodiment, the braking assembly 30 is used to control (e.g. maintain constant) the speed of the low pressure spool 24a without allowing the speed of the high pressure spool 24b to drop below a predetermined value, the speed of the low pressure spool 24a being maintained at a lower value than what it would be without application of the braking assembly 30. Reducing or preventing the increase of the speed of the low pressure turbine rotor 18a may be desirable in various situations. For example, in turbofans, under certain flight conditions, such as during a rapid descent, the delivery of fuel in the combustor 16 is reduced. The rotation of the low pressure turbine 18a rotor is thus minimally induced in rotation by the combustion gases. As a result, the low pressure turbine may become unloaded, or free. The ambient air may then force the propeller 12 to rotate, which will contribute to the rotation of the of the low pressure turbine rotor 18a. The rotation of the propeller 12 may, in some cases, generate a rotation of the low pressure turbine rotor 18a that is beyond recommended level. In order to control the rotation of the low pressure turbine rotor 18a, for example before or when in free rotation mode, without further reducing delivery of the fuel to the combustor 16, the braking assembly 30 is activated by the control unit 26. The braking assembly 30, distinct from the combustor 16, acts directly onto the low pressure spool 24a which contains the low pressure turbine rotor 18a to limit the rotation of the low pressure turbine rotor 18a when the predetermined condition is reached, by reducing or preventing increase of the rotation of the low pressure turbine rotor 18a. In some cases, it may be desired to use the braking assembly 30 before the low pressure spool 24a is unloaded. Various non-limiting exemplary embodiments and locations of the braking assembly 30 will be described below. The gas turbine engine 10 is only one example of a gas turbine engine that could have the braking assembly 30 described below. The braking assembly 30 could be mounted on low pressure spools of any turboprops, turbofans, and turboshafts, for helicopter or conventional aircrafts. In turboshafts, for example, a control system may maintain a speed of rotation of the low pressure turbine rotor at a fixed speed. As rapid descent begins, flow through the main rotor will be such that it is driving the speed of the main rotor higher than a reference speed of the low pressure spool. The low pressure spool may become declutched and become unloaded. The braking assembly can be activated to reduce or prevent increase of the speed of rotation of the low pressure turbine rotor, either after of before the low pressure spool becomes declutched and become unloaded. An example of helicopter turboshaft engine 100 having a braking assembly 130 and an example of turbofan engine 200 having a braking assembly 230 will be described below in reference to FIGS. 6 and 7.

Figure 2:
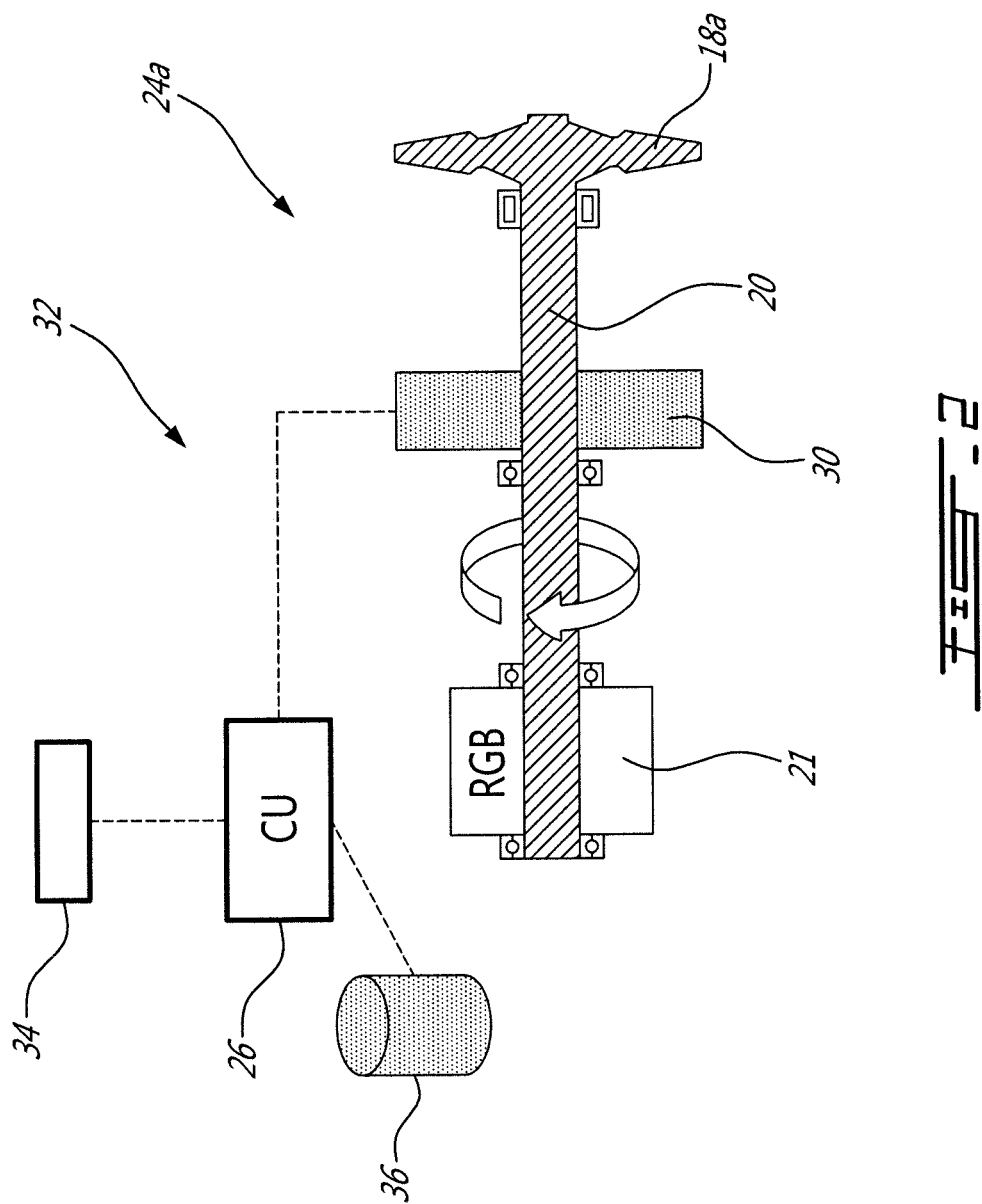
FIG. 2 is a schematic cross-sectional view of the braking system.

Turning to FIG. 2, a braking system 32, illustrated schematically, includes the braking assembly 30 mounted on the low pressure spool 24a and the control unit 26. The control unit 26 receives information from various sensors 34 disposed throughout the gas turbine engine 10. These sensors may provide information on, for example, speed of rotation of the propeller 12, fuel amount delivered to the combustor 16 and/or speed of rotation of the low pressure turbine rotor 18a. At least one of these sensors provides one or more data indicative of a speed of rotation of the low pressure spool 24a. Depending on a type of the engine 10, the at least one of these sensors could be, non-exhaustively, a sensor providing information on speed of the low pressure spool 24a, or the torque of the low pressure spool 24a, or the speed of the high pressure spool 24b, or any other parameter directly or indirectly indicative of a speed of rotation of the low pressure spool 24a. The control unit 26 is in communication with a database 36, which includes various flight parameters. In one embodiment, the database 36 includes one or more threshold values or upper limits of the speed of rotation of the low pressure turbine rotor 18a or low pressure shaft 20.

Based on the information collected by the sensors 34 and comparing in real time with data stored on the database 36, the control unit 26 selectively actuates the braking assembly 30. For example, if one of the sensors 34 registers the speed of rotation of the turbine rotor 18a above a predetermined value, the control unit 26 may actuate the braking assembly 30 until the speed of rotation of the turbine rotor 18a is below the predetermined value. The predetermined value may vary for different flight conditions (i.e. may depend on various parameters of the gas turbine engine 10 that may evolve also in real time). When the braking assembly 30 is not actuated, it does not interfere with a rotation of the low pressure spool 24a.

The braking assembly 30 is shown in FIG. 2 to be connected directly on the low pressure shaft 20, but it is contemplated that the braking assembly 30 could be the connected to low pressure spool 24a, either directly through connection with any other element of the low pressure spool 24a, or indirectly through connection to an element drivingly engaged with the low pressure spool 24a. For example, the braking assembly 30 could be disposed on the low pressure turbine rotor 18a, or on gears of the RGB 21, or in some cases on the propeller shaft 23.

The braking assembly 30 may be any system directly acting on low pressure turbine rotor 18a and which will decrease or prevent increase of the speed of rotation of the low pressure turbine rotor 18a by means other than a reduction of the fuel amount provided to the combustor 16. For example, the braking assembly 30 can be activated to maintain the speed of rotation of the low pressure spool 24a at a certain value while a speed of rotation of the high pressure spool 24b is increased, i.e. to prevent the increase of low pressure spool speed that would otherwise result from the increase in exhaust flow driving the increase in the speed of the high pressure spool 24b. In a particular embodiment, the braking assembly 30 applies a rotational force on the low pressure spool 24a opposing its direction of rotation.

Figure 3:
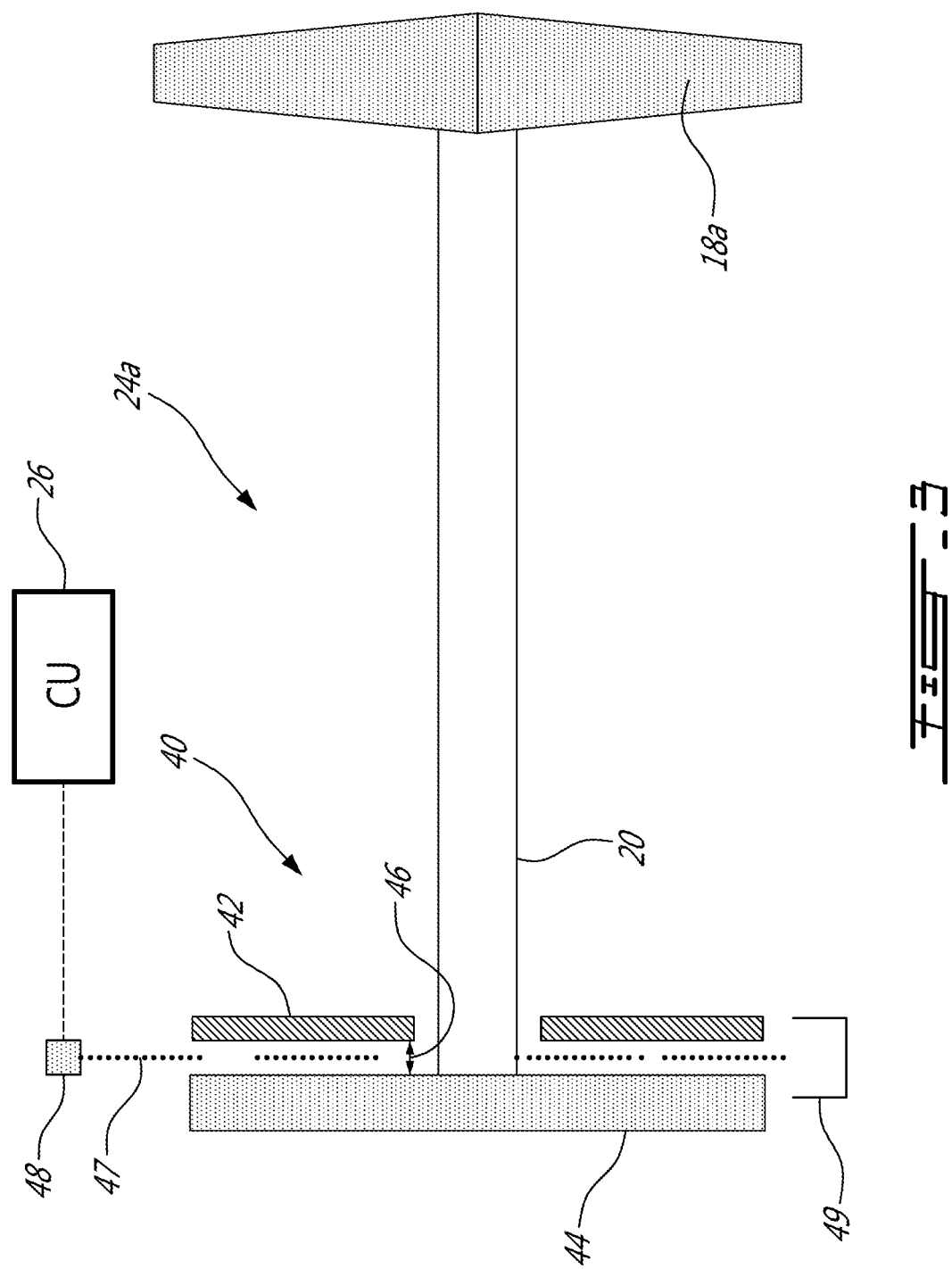
FIG. 3 is a schematic cross-sectional view of an embodiment of a braking assembly of the braking system of FIG. 2.

Turning to FIG. 3, a particular embodiment of the braking assembly, in the shape of a hydraulic braking assembly 40 is schematically illustrated.

The braking assembly 40 includes a plate 42 disposed parallel to and in close proximity of a gear 44 of the RGB 21. The gear 44 is, in this example, mounted onto the low pressure shaft 20. It is however contemplated that the gear 44 of the RGB 21 could instead be a gear coupled to the propeller shaft 23. An axial gap 46 is created between the plate 42 and the gear 44. The plate 42 is stationary. A fluid delivery valve 48 controls fluid flow to the gap 46 and dispenses fluid in the gap 46. In one embodiment, the fluid delivery valve 48 is delivering oil from a lubrication system of the gas turbine engine 10 to the gap 46. The fluid 47 may then flow in the gap 46, for example by gravity or by pressure from a pumping device, so that the gap 46 is filled with fluid 47. The braking assembly 40 may include a fluid receiver 49 (or sump) disposed opposite to the fluid delivery valve 48 so as to recuperate fluid that has flown though the gap 46. The fluid may then be re-injected in a fluid circuit, such as the lubrication system for the oil. In one embodiment, the gear 44 has holes in the web and the fluid is forced through the holes in the gear 44 to fill the gap 46. In a particular embodiment, oil from the lubrication system may be used as the fluid. In a particular embodiment, the braking assembly 40 is used when the demands on the engine oil system are low, which makes it possible to divert part of the oil of the engine oil system to the braking assembly 40 to be used as the braking fluid.

The fluid delivery valve 48 is actuated by the control unit 26. When the control unit 26 determines that braking of the low pressure spool 24a is necessary, for example from the monitored parameter(s) indicative of the speed of rotation of the low pressure spool 24a (e.g. speed of rotation of the low pressure spool 24a or the high pressure spool 24b, low pressure spool 24a torque) having reached a critical value, the control unit 26 commands the fluid delivery valve 48 to deliver fluid 47 to the gap 46. The fluid 47 is constrained by the rotating gear 44 and a static plate 42. The difference of speeds between the gear 44 and the plate 42 creates a hydraulic friction force through the fluid 47, or drag, which tends to reduce the difference of speeds, acting against a rotation of the rotating low pressure shaft 20 and as a result slowing down or preventing a speed increase of the rotating gear 44. When the control unit 26 determines from the monitored parameter(s) that braking of the low pressure spool 24a is no longer necessary, the braking assembly 40 is unactuated, and as such no fluid 47 is injected in the gap 46 and the gear 44 is free to rotate.

While the hydraulic braking assembly 40 is illustrated in FIG. 3 to be indirectly connected to the low pressure spool 24a by being provided on the gear 44 of the RGB 21, it is contemplated that gear 44 could be replaced with a plate member directly connected to any element of the low pressure spool 24a or indirectly connected to the low pressure spool 24a through connection with an element drivingly engaged with the low pressure spool 24a. For example, the plate member could be provided on the low pressure shaft 20, the low pressure turbine rotor 18a, or in some cases the propeller shaft 23.

Figure 4:
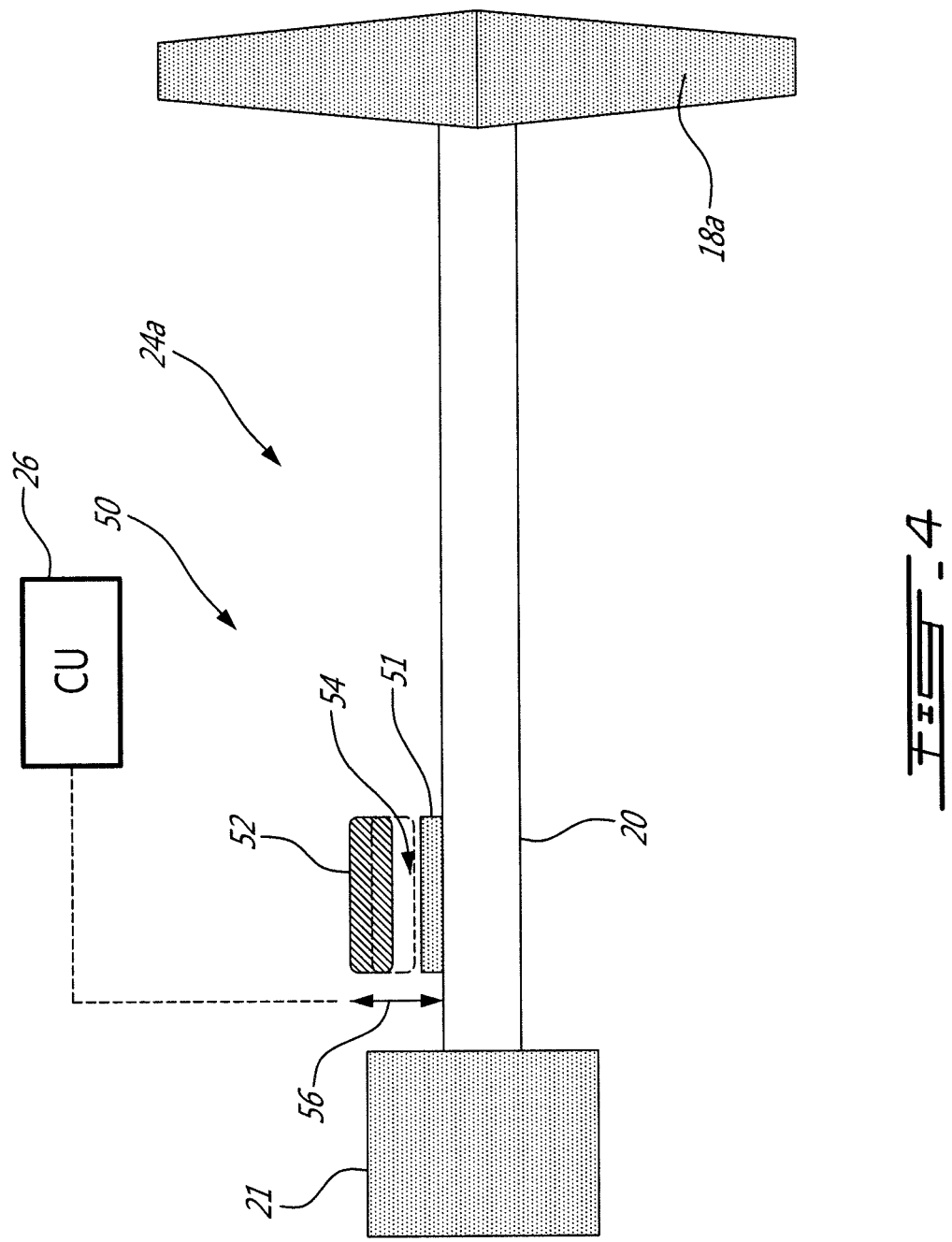
FIG. 4 is a schematic cross-sectional view of another embodiment of a braking assembly of the braking system of FIG. 2.

Turning to FIG. 4, another embodiment of the braking assembly in the shape of a mechanical braking assembly 50 is schematically illustrated.

The braking assembly 50 includes a movable plate 52 disposed at proximity of the low pressure shaft 20. A radial gap 54 is created between the plate 52 and a brake pad 51 around the low pressure shaft 20. The plate 52 is fixed in rotation relative to the gas turbine engine 10. The plate 52 is radially movable between an actuated state where the plate 52 contacts the pad 51 (shown in phantom) and an unactuated state where the plate 52 is disposed away from the low pressure shaft 20 (shown in solid). Movement of the plate 52 is illustrated by arrow 56. The movement of the plate 52 is controlled by the control unit 26, for example through a hydraulic actuation system. When the control unit 26 determines that braking of the low pressure spool 24a is necessary, for example from the monitored parameter(s) indicative of the speed of rotation of the low pressure spool 24a having reached a critical value, the control unit 26 actuates the braking assembly by commanding the plate 52 to move to the second position, close the gap 54 and frictionally engages the low pressure shaft 20. The difference of speeds between the static plate 52 and the rotating low pressure shaft 20 creates a friction force which tends to reduce the difference of speeds, acting against a rotation of the rotating low pressure shaft 20 and as a result slowing down or preventing a speed increase of the rotating low pressure shaft 20. When the control unit 26 determines from the monitored parameter(s) that braking of the low pressure spool 24a is no longer necessary, the control unit 26 commands the plate 52 to be in the unactuated state, away from the low pressure shaft 20, thereby reopening the gap 54 and alleviating friction.

While the pad 51 is illustrated in FIG. 4 in engagement with the low pressure shaft 20, it is contemplated that the pad 51 could be directly connected to any other element of the low pressure spool 24a, or indirectly connected to the low pressure spool 24a through connection with an element drivingly engaged with the low pressure spool 24a. For example, the pad 51 could be provided on the low pressure turbine rotor 18a, a gear of the RGB 21, or the propeller shaft 23.

Figure 5:
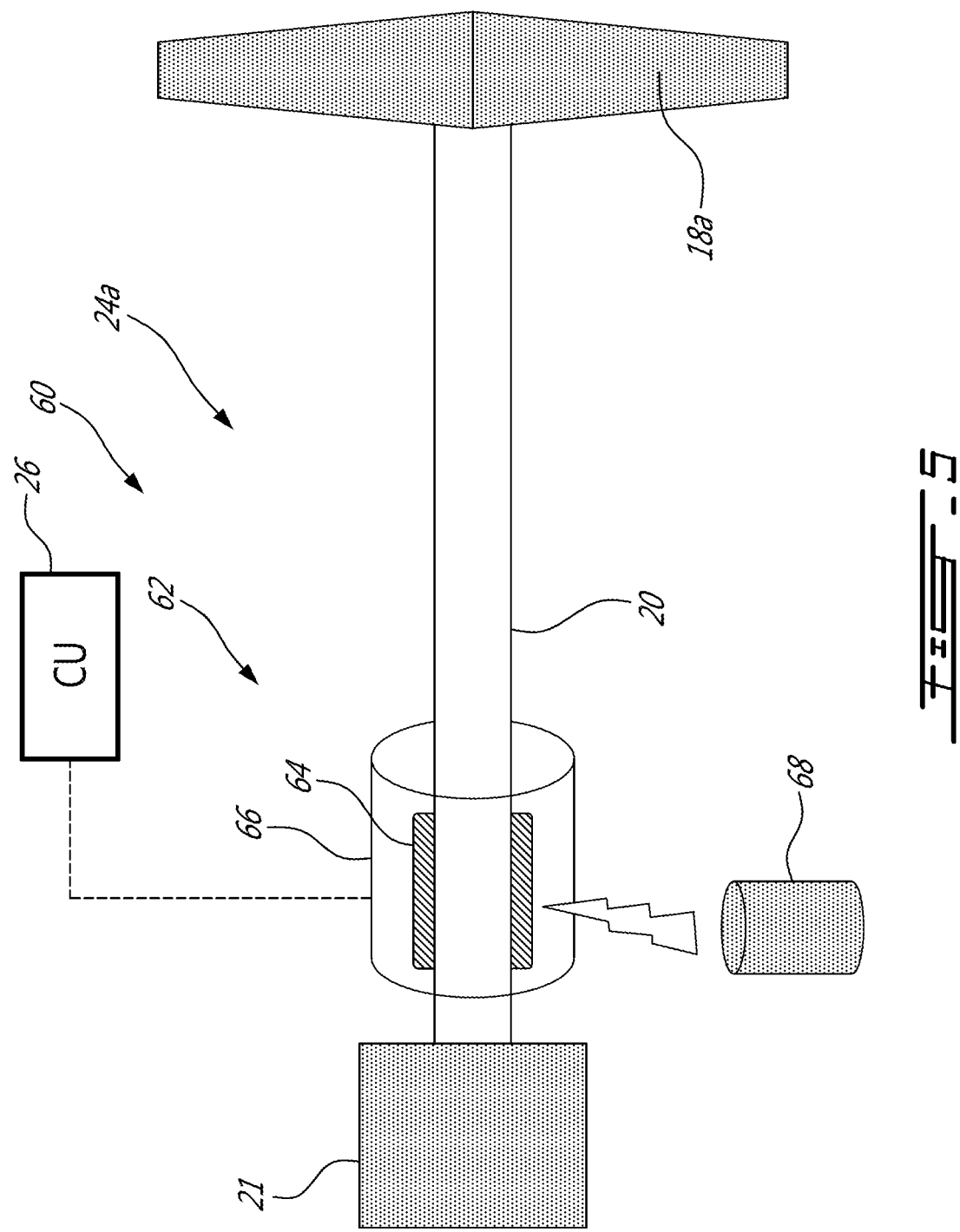
FIG. 5 is a schematic cross-sectional view of yet another embodiment of a braking assembly of the braking system of FIG. 2.

Turning to FIG. 5, a third embodiment of the braking assembly in the shape of a magnetic braking assembly 60 is schematically illustrated.

The braking assembly 60 includes a magnetic assembly 62 having complementary portions disposed on the rotating low pressure shaft 20 and fixed relative to the gas turbine engine 10. In one embodiment, the magnetic assembly 62 is an electromagnet including a magnet 64 disposed on the low pressure shaft 20, and a coil 66 disposed around the magnet 64 and the low pressure shaft 20. The magnetic assembly 62 may be polarised by the control unit 26. In an unactuated state, no current circulates in the coil 66, and a rotation of the magnet 64 relative to the coil 66 has no influence on the rotation of the low pressure shaft 20.

When the control unit 26 determines that braking of the low pressure spool 24a is necessary, for example from the monitored parameter(s) indicative of the speed of rotation of the low pressure spool 24a having reached a critical value, the control unit 26 commands electric current to run in the coil 66. The magnetic assembly 62 produces a magnetic force which acts against a rotation of the low pressure shaft 20 to reduce its rotational speed. When the control unit 26 determines from the monitored parameter(s) that braking of the low pressure spool 24a is no longer necessary, the control unit 26 commands the braking assembly 60 to be in its unactuated state, thus interrupting current delivery in the coil 66.

In one embodiment, the magnetic assembly 62 is connected to an energy storage medium 68, for example a battery. When the braking assembly 60 is actuated, the energy storage medium 68 may store energy created by the magnetic assembly 62. The energy storage medium 68 may then be used to power auxiliary devices of the gas turbine engine 10. The storage medium 68 could also be located out of the engine, for example in the aircraft.

While the magnet 64 is illustrated in FIG. 5 to be connected to the low pressure shaft 20, it is contemplated that the magnet 64 could be directly connected to any other element of the low pressure spool 24a, or indirectly connected to the low pressure spool 24a through connection with an element drivingly engaged with the low pressure spool 24a. For example, the magnet 64 could be connected to a gear of the RGB 21, the low pressure turbine rotor 18a or the propeller shaft 23. The configuration of the magnetic assembly 62 could also be reversed, with the magnet being static and the coil connected to the rotating element.

Figure 6:
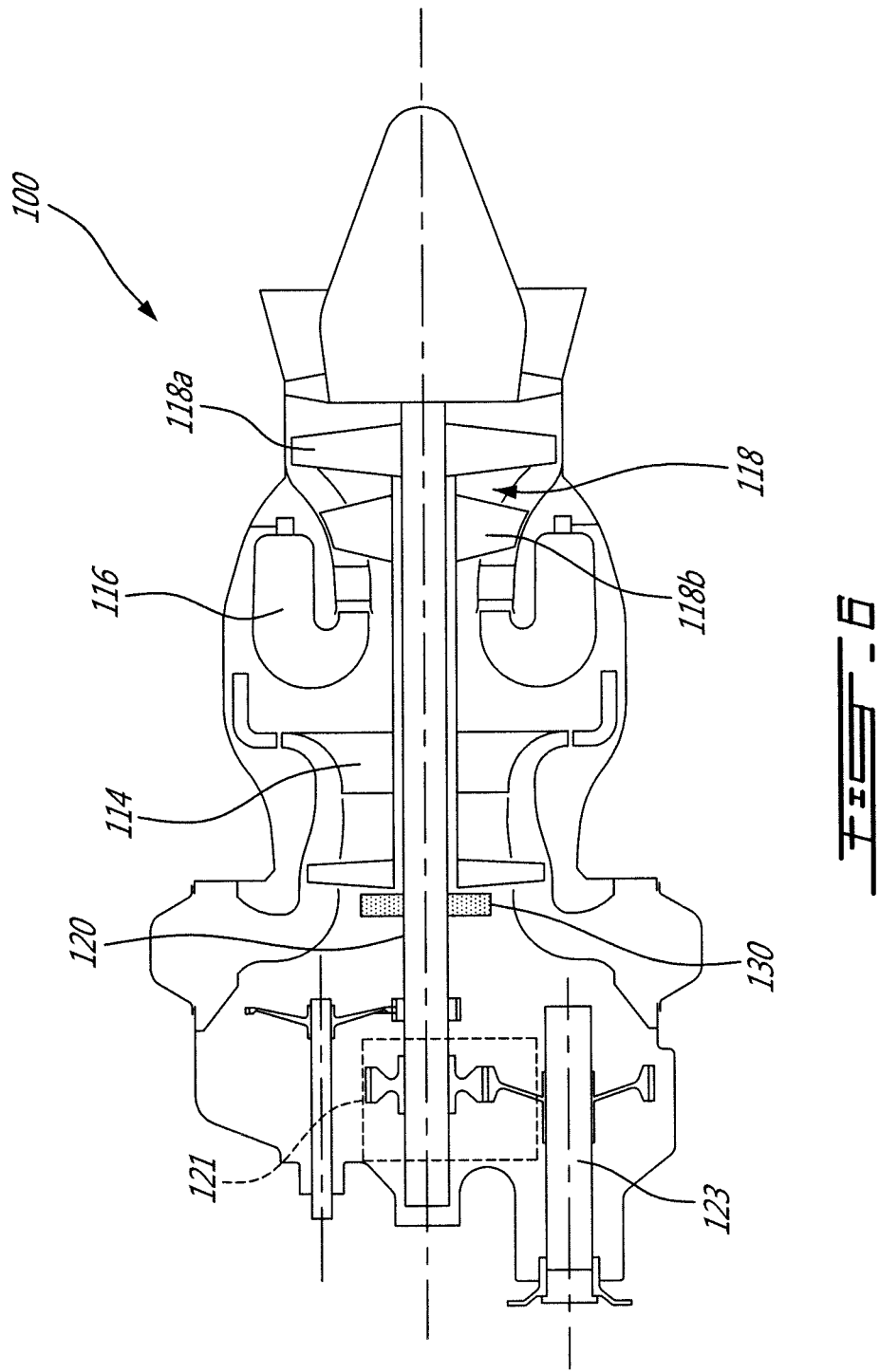
FIG. 6 is a schematic cross-sectional view of another embodiment of a gas turbine engine having a braking system.

Turning now to FIG. 6, an example of helicopter turboshaft engine 100 includes a compressor section 114, a combustor 116, and a turbine section 118 having similar functions to those recited for the gas turbine engine 10. The similar elements between the turboprop engine 10 and the turboshaft engine 100 will not be described in details again, and will have same reference numeral as the similar elements of the turboprop engine 10, incremented by one hundred. The turbine section 118 includes a low pressure turbine having rotor(s) 118a, and a high pressure turbine having rotor(s) 118b connected to rotor(s) of the compressor section 114. The low pressure turbine rotor(s) 118a are mounted at one end of a low pressure shaft 120 and another end of the low pressure shaft 120 is connected to a reduction gearbox (RGB) 121. The RGB 121 transmits a speed of rotation to an output shaft 123 reduced relative to a speed of rotation of the low pressure shaft 120. The output shaft 123 is connected to a load, for example a helicopter rotor; this connection may be done through a main reduction gearbox and/or clutch (not shown). The low pressure turbine rotor(s) 118a and the low pressure shaft 120 are part of a low pressure spool 124a. Although not shown, the low pressure spool 124a may include rotor(s) of the compressor section 114 connected to the low pressure shaft 120. The high pressure turbine rotor(s) 118b are connected to rotor(s) of the compressor section 114 via a high pressure shaft 122. The high pressure turbine rotor(s) 118b, the high pressure rotor(s) of the compressor section 114, and the high pressure shaft 122 are part of a high pressure spool 124b. The turboshaft engine 100 includes the braking assembly 130 similar to the braking assembly 30 and connected to the low pressure spool 124a (either directly, or indirectly through connection with an element drivingly engaged to the low pressure spool 124a, e.g. RGB 121). The braking assembly 130 may include the various embodiments of the braking assembly 30 described above.

Figure 7:
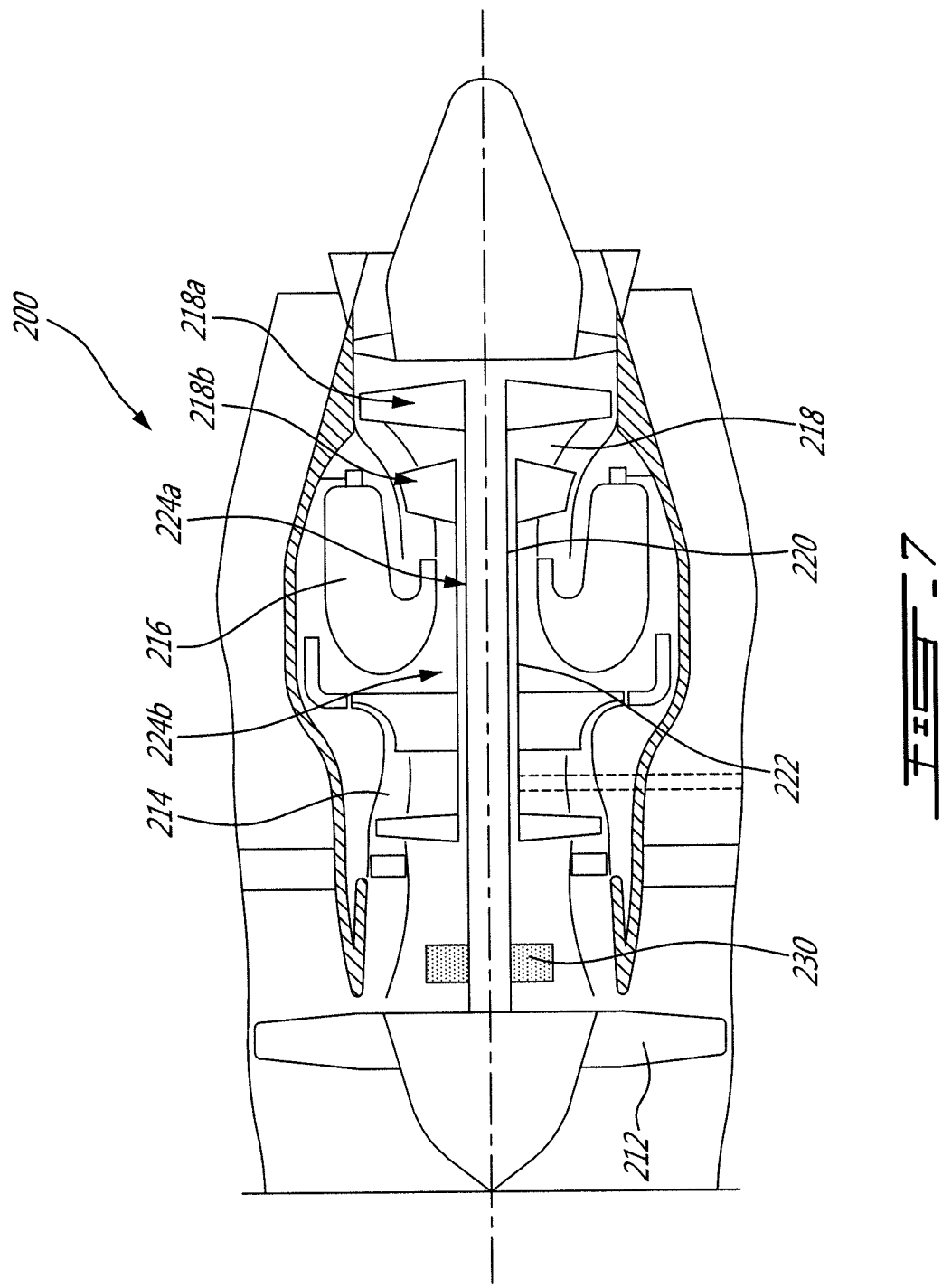
FIG. 7 is a schematic cross-sectional view of yet another embodiment of a gas turbine engine having a braking system.

Turning now to FIG. 7, an example of turbofan engine 200 includes a fan 212, a compressor section 214, a combustor 216, and a turbine section 218 having similar functions to those recited for the gas turbine engine 10. The similar elements between the turboprop engine 10 and the turbofan engine 200 will not be described in details again, and will have same reference numeral as the similar elements of the turboprop engine 10, incremented by two hundred. The turbine section 218 includes a low pressure turbine having rotor(s) 218a connected to rotor(s) of the fan 212, and a high pressure turbine having rotor(s) 218b connected to the rotor(s) of the high pressure compressor section 214. The low pressure turbine rotor(s) 218a are mounted at one end of a low pressure shaft 220, and the rotor(s) of the fan 212 are mounted at the other end of the low pressure shaft 220. The high pressure turbine rotor(s) 218b are connected to the rotor(s) of the compressor section 214 via a high pressure shaft 222. The low pressure turbine rotor(s) 218a, the low pressure shaft 220, and the fan rotor(s) 212 are part of a low pressure spool 224a. The high pressure turbine rotor(s) 218b, the high pressure compressor section rotor(s) 214, and the high pressure shaft 222 are part of a high pressure spool 224b. The turbofan engine 200 includes a braking assembly 230 similar to the braking assembly 30 and connected to the low pressure spool 224a (either directly, or indirectly through connection with an element drivingly engaged to the low pressure spool 224a). The braking assembly 230 could include the various embodiments of the braking assembly 30 described above.

In a particular embodiment, the braking assemblies described above may be retrofitted to existing engines without undue burden. For any type of engines (turboshaft, turbofan, turboprop) mechanical and/or software functions may prevent the fuel flow and/or a speed of the high pressure spool to drop below certain values, once the engine has started. This could in turn prevent flameout of the engine, or surging, or poor engine operability. The braking assembly may allow to maintain the fuel flow as high as possible through allowing the speed of rotation of the high pressure spool to remain above a predetermined lower limit, while maintaining an adequate speed for the low pressure spool, i.e. output shaft, propeller or fan, at a lower level than would otherwise be associated with the desired speed of rotation of the high pressure spool. The above described embodiments and/or other embodiments can be used individually or in combination, e.g. the hydraulic and/or mechanical and/or magnetic braking systems described above may be used concurrently.

The braking assembly may be used simultaneously with (or sequentially after) an increase of the amount of fuel to a predetermined level. In a particular embodiment, by reducing a speed of rotation of the low pressure spool with the help of the braking assembly, more fuel can be used to keep a higher speed of the high pressure spool compared to engines not having the braking assembly and undergoing similar flight conditions.

Accordingly in a particular embodiment, the braking system allows for the speed of the high pressure spool to be kept above a certain minimum threshold (HP spool requirement) while keeping the speed of the low pressure spool below a certain maximum threshold (LP spool requirement). In the absence of the braking system, these requirements may be conflicting when the required fuel flow violates one of these requirements (e.g. allowing the high pressure spool to fall below the minimum threshold) in order to abide by the other requirement (e.g. ensure the low pressure pool does not exceed the maximum threshold). The braking system may thus allow independent and/or separate control of the rotational speed of the two spools, by allowing the fuel flow to be set to respect the high pressure spool requirement while using the braking system to respect the low pressure spool requirement.

In a particular embodiment, by reducing a speed of rotation of the low pressure spool with the help of the braking assembly instead of through a reduction of fuel flow (and of the speed of rotation of the high pressure spool), the increase in the gas turbine engine speed, once the particular flight condition having required the speed reduction (e.g. rapid descent) is over, may be done quicker than for a similar engine where the speed reduction is performed using fuel flow reduction, i.e. without the braking assembly.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A gas turbine engine comprising:
   a low pressure spool and a high pressure spool rotating independently from one another;
   a reduction gearbox connected to a low pressure shaft of the low pressure spool for transmitting a speed of rotation to an output shaft or a propeller shaft; and
   a braking assembly connected to the low pressure spool by being directly connected to a gear of the reduction gearbox, the braking assembly being reversibly configurable between an actuated state and an unactuated state, the braking assembly in the unactuated state allowing rotation of the low pressure spool without interference between the braking assembly and the low pressure spool,
   wherein the braking assembly includes a movable plate movable to frictionally engage a pad connected to the low pressure spool when the braking assembly is in the actuated state, the plate being disposed away from the pad when the braking assembly is in the unactuated state, and/or
   wherein the braking assembly includes a static plate disposed in proximity of, spaced apart from and parallel with a surface of a web of the gear of the gearbox, a fluid being injected between the static plate and the surface when the braking assembly is in the actuated state,
   the braking assembly in the actuated state applying a hydraulic friction force directly on the web of the gear and/or a friction force on the low pressure spool, the hydraulic friction force and/or the friction force opposing the rotation of the low pressure spool, the braking assembly being operatively disengaged from the high pressure spool in both of the actuated state and the unactuated state.

2. The gas turbine engine of claim 1, further comprising a control unit connected to the braking assembly and selectively configuring the braking assembly between the actuated state and the unactuated state.

3. The gas turbine engine of claim 2, further comprising a database in communication with the control unit, the database including at least one threshold value of at least one parameter indicative of a speed of rotation of the low pressure spool, the control unit configuring the state of the braking assembly based on a difference between a measured value of the at least one parameter and the at least one threshold value.

4. The gas turbine engine of claim 1, wherein the braking assembly further includes a magnetic assembly including complementary magnet and coil relatively disposed one around the other, one of the magnet and the coil being connected to the low pressure spool such as to rotate therewith, the coil being energized when the braking assembly is in the actuated state to create a magnetic force opposing the rotation of the low pressure spool through interaction with the magnet.

5. The gas turbine engine of claim 4, further comprising an energy storage medium connected to the magnetic assembly, the energy storage medium recuperating energy produced by an interaction between the magnet and coil when the braking assembly is in the actuated state.

6. The gas turbine engine of claim 1, wherein the fluid is oil from a lubrication system of the gas turbine engine.

7. The gas turbine engine of claim 1, further comprising:
   at least one sensor measuring at least one parameter indicative of a speed of rotation of the low pressure spool;
   a database including at least one threshold value of the at least one parameter; and
   a control unit in communication in real time with the at least one sensor and the database, the control unit selectively configuring the braking assembly between the actuated state and the unactuated state based on the at least one threshold value stored in the database and the at least one parameter by the at least one sensor.

8. The gas turbine engine of claim 7, wherein the braking assembly includes a magnetic assembly including complementary magnet and coil relatively disposed one around the other, one of the magnet and the coil being connected to the low pressure spool such as to rotate therewith, the coil being energized when the braking assembly is in the actuated state to create a magnetic force opposing the rotation of the low pressure spool.

9. The gas turbine engine of claim 7, wherein the fluid is oil from a lubrication system of the gas turbine engine.

10. A method of controlling a speed of rotation of a low pressure spool in a gas turbine engine, the method comprising:
    rotating the low pressure spool independently of a high pressure spool of the gas turbine engine;
    determining if at least one parameter indicative of the speed of rotation of the low pressure spool has crossed at least one predetermined threshold value;
    if the at least one parameter has crossed the predetermined threshold value, actuating a braking assembly by delivering fluid between a static plate and a surface of a web of a gear of a reduction gearbox connected to a low pressure shaft of the low pressure spool to apply a hydraulic friction force directly to the web of the gear of the reduction gearbox and/or by moving a non-rotating plate to frictionally engage a pad connected to the low pressure spool to create a friction force on the low pressure spool, the hydraulic friction force and/or the friction force opposing the rotation of the low pressure spool, the low pressure spool rotating independently of the high pressure spool independently of the force being applied.

11. The method of claim 10, wherein determining if the at least one parameter has crossed the at least one predetermined threshold value comprises:
    measuring the at least one parameter with at least one sensor;
    receiving the measured at least one parameter with a control unit;
    accessing the at least one predetermined threshold value of the at least one parameter stored in a database; and comparing with the control unit the measured at least one parameter with the at least one predetermined threshold value from the database.

12. The method of claim 10, wherein actuating the braking assembly further comprises creating a magnetic force opposing the rotation of the low pressure spool on the low pressure spool.

13. The method of claim 12, wherein the creating of the magnetic force includes storing energy into an energy storage medium.

14. The method of claim 13, comprising recuperating energy produced by an interaction between a magnet and a coil when the hydraulic friction force and/or the friction force is applied.

15. The method of claim 10, wherein the delivering of the fluid includes delivering oil from a lubrication system of the gas turbine engine.

16. A method of controlling a speed of rotation of low and high pressure spools in a gas turbine engine, the method comprising:
maintaining the speed of rotation of the high pressure spool above a second threshold value by controlling a fuel flow of the gas turbine engine; and
maintaining the speed of rotation of the low pressure spool below a first threshold value by selectively applying a hydraulic friction force directly on a web of a gear of a reduction gearbox connected to a low pressure shaft of the low pressure spool by delivering fluid between a static plate and a surface of the web and/or applying a friction force on the low pressure spool by moving a non-rotating plate to frictionally engage a pad connected to the low pressure spool, while the low pressure spool rotates independently of the high pressure spool, the low pressure spool rotating independently of the high pressure spool independently of the force being applied.

17. The method of claim 16, wherein the delivering of the fluid includes delivering oil from a lubrication system of the gas turbine engine.

18. The method of claim 16, wherein the maintaining of the speed of rotation of the low pressure spool below the first threshold value further includes creating a magnetic force opposing the rotation of the low pressure spool on the low pressure spool.

19. The method of claim 18, wherein the creating of the magnetic force includes storing energy into an energy storage medium.

20. The method of claim 19, comprising recuperating energy produced by an interaction between a magnet and a coil when the friction force and/or the hydraulic friction force is applied.

* * * * *